United States Patent
Komura et al.

(10) Patent No.: US 11,808,963 B2
(45) Date of Patent: Nov. 7, 2023

(54) ILLUMINATION DEVICE AND DISPLAY DEVICE

(71) Applicant: Japan Display Inc., Tokyo (JP)

(72) Inventors: Shinichi Komura, Tokyo (JP); Koichi Okuda, Tokyo (JP); Hiroaki Kijima, Tokyo (JP); Ken Onoda, Tokyo (JP)

(73) Assignee: JAPAN DISPLAY INC., Tokyo (JP)

(*) Notice: Subject to any disclaimer, the term of this patent is extended or adjusted under 35 U.S.C. 154(b) by 0 days.

(21) Appl. No.: 17/981,558

(22) Filed: Nov. 7, 2022

(65) Prior Publication Data
US 2023/0144819 A1    May 11, 2023

(30) Foreign Application Priority Data
Nov. 8, 2021 (JP) .................. 2021-181733

(51) Int. Cl.
    *F21V 8/00* (2006.01)
(52) U.S. Cl.
    CPC ......... *G02B 6/0036* (2013.01); *G02B 6/0045* (2013.01); *G02B 6/0068* (2013.01)

(58) Field of Classification Search
CPC ... G02B 6/0036; G02B 6/0045; G02B 6/0068
See application file for complete search history.

(56) References Cited

U.S. PATENT DOCUMENTS

2018/0074252 A1* 3/2018 Fukuma ............... G02B 6/0038

FOREIGN PATENT DOCUMENTS

JP            6797726 B2      12/2020

* cited by examiner

*Primary Examiner* — Andrew J Coughlin
*Assistant Examiner* — Jessica M Apenteng
(74) *Attorney, Agent, or Firm* — XSENSUS LLP

(57) ABSTRACT

According to one embodiment, an illumination device includes a light guide including a first main surface, a second main surface, a first side surface, and a second side surface, a plurality of convex portions provided on the second main surface, and a first light source element and a second light source element opposing the first side surface and the second side surface, respectively, and when an incident angle of a main ray of the light propagating in the light guide is expressed by θ, a diffusion angle of the light is δ, an angle of the convex portion of the light guide is α, a critical angle of the light guide is θc, and an angle which satisfies (90°−θc) is β0, a relationship: $((\beta 0+\delta)/3)<\theta<((\beta 0-\delta)/2)$ is satisfied.

8 Claims, 11 Drawing Sheets

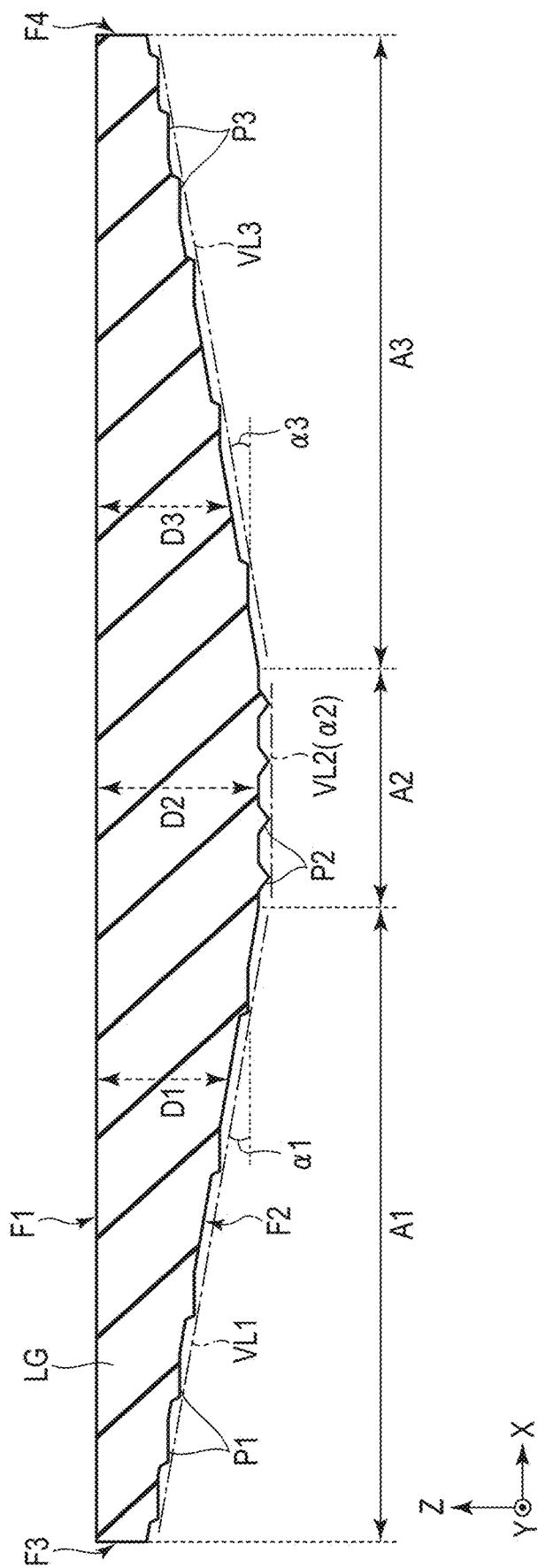
F I G. 4

ILLUMINATION DEVICE AND DISPLAY DEVICE

CROSS-REFERENCE TO RELATED APPLICATIONS

This application is based upon and claims the benefit of priority from Japanese Patent Application No. 2021-181733 filed Nov. 8, 2021, the entire contents of which are incorporated herein by reference.

FIELD

Embodiments described herein relate generally to an illumination device and a display device.

BACKGROUND

Display devices, for example, liquid crystal display devices or the like, comprise a display panel including pixels and an illumination device such as a backlight, which illuminates the display panel. The illumination device comprises has a light source which emits light and a light guide to which the light from the light source is irradiated. Light from the light source enters the light guide from a side surface, propagates through the light guide, and exits from an emission surface corresponding to one of the main surfaces of the light guide.

BRIEF DESCRIPTION OF THE DRAWINGS

FIG. 4 is a cross-sectional view schematically showing a configuration example of a light guide.

DETAILED DESCRIPTION

Figure 1:
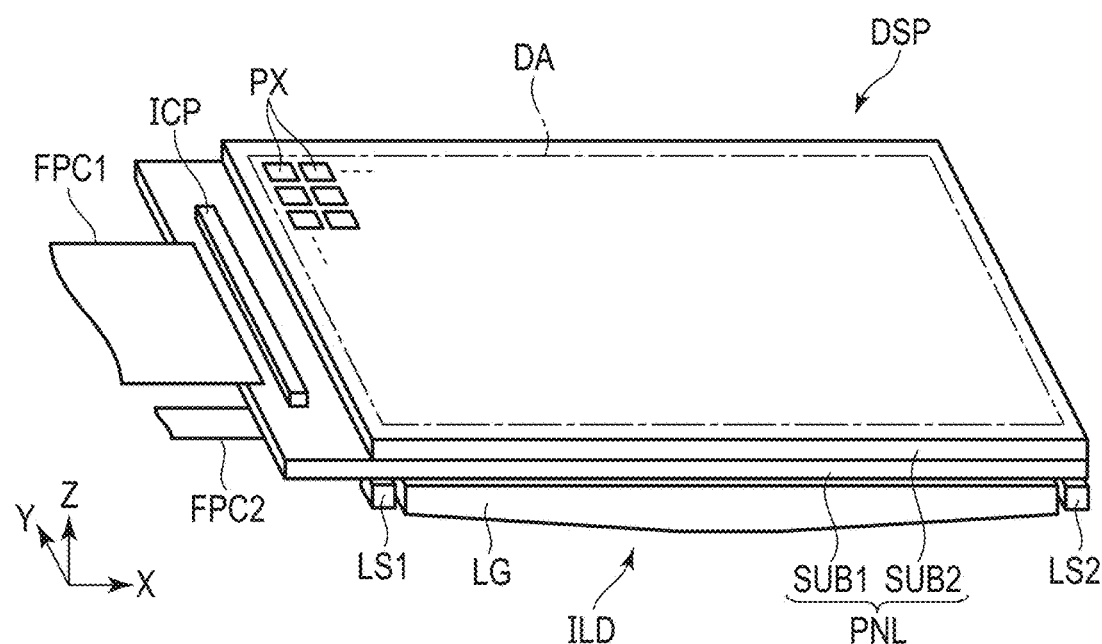
FIG. 1 is a perspective view schematically showing of a configuration of a display device of an embodiment.

In general, according to one embodiment, an illumination device comprises
  a light guide including a first main surface which emits light, a second main surface on an opposite side to the first main surface, a first side surface and a second side surface on an opposite side to the first side surface;
  a plurality of convex portions provided on the second main surface of the light guide; and
  a first light source element and a second light source element which respectively oppose the first side surface and the second side surface of the light guide, wherein
  light emitted from each of the first light source element and the second light source element enters inside the light guide from the first side surface and the second side surface, and the entering light propagates inside the light guide while being reflected on the first main surface and the second main surface, and
  when an incident angle of a main ray of the propagating light is expressed by $\theta$, a diffusion angle of the light is expressed by $\delta$, an angle of the convex portion of the light guide is expressed by $\alpha$, a critical angle of the light guide is expressed by $\theta c$, and an angle which satisfies $(90°-\theta c)$ is expressed by $\beta 0$, a relationship: $((\beta 0+\delta)/3)<\theta<((\beta 0-\delta)/2)$ is satisfied.

According to another embodiment, an illumination device comprises
  a light guide including a first main surface which emits light, a second main surface on an opposite side to the first main surface, a first side surface and a second side surface on an opposite side to the first side surface;
  a plurality of convex portions provided on the second main surface of the light guide;
  a reflector provided to oppose the first side surface of the light guide; and
  a light source element opposing the second side surface of the light guide, wherein
  light emitted from the light source element enters inside the light guide from the second side surface, and the entering light propagates inside the light guide while being reflected on the first main surface and the second main surface, and
  when an incident angle of a main ray of the propagating light is expressed by $\theta$, a diffusion angle of the light is expressed by $\delta$, an angle of the convex portion of the light guide is expressed by $\alpha$, a critical angle of the light guide is expressed by $\theta c$, and an angle which satisfies $(90°-\theta c)$ is expressed by $\beta 0$, a relationship: $((\beta 0+\delta)/3)<\theta<((\beta 0-\delta)/2)$ being satisfied.

An object of the embodiments is to provide an illumination device which irradiates illumination light at high emission efficiency and such a display device.

Embodiments will be described hereinafter with reference to the accompanying drawings. Note that, throughout the embodiments, common structural elements are denoted by the same symbols and redundant explanations are omitted. Further, the drawings are schematic diagrams to facilitate understanding of the embodiments, and the shapes, dimensions, ratios, etc., may differ from actual conditions, but they may be redesigned as appropriate, taking into account the following descriptions and conventionally known technology.

The followings are detailed descriptions of an illumination device according to one embodiment with reference to the drawings.

In the embodiment, a first direction X, a second direction Y and a third direction Z are orthogonal to each other, but they may intersect at an angle other than 90°. In the following descriptions, a direction forwarding a tip of an arrow indicating the third direction Z is referred to as "upward" or "above" and a direction forwarding oppositely from the tip of the arrow is referred to as "downward" or "below". The first direction X, the second direction Y and third direction Z may as well be referred to as an X direction, a Y direction and a Z direction, respectively.

With such expressions "a second member above a first member" and "a second member below a first member", the second member may be in contact with the first member or may be remote from the first member. In the latter case, a third member may be interposed between the first member and the second member. On the other hand, with such expressions "a second member on a first member" and "a second member on a first member", the second member is meant to be in contact with the first member.

In addition, it is assumed that there is an observation position to observe the semiconductor substrate on a tip side of an arrow in the third direction Z, and viewing from this observation position toward the X-Y plane defined by the first direction X and the second direction Y is referred to as a planar view. Viewing a cross section of the transistor in an X-Z plane defined by the first direction X and the third direction Z or a Y-Z plane defined by the second direction Y and the third direction Z is referred to as a cross-sectional view.

In each embodiment, a transmissive liquid crystal display device is disclosed as an example of a display device. Further, a backlight of a liquid crystal display device is disclosed as an example of an illumination device. However, each embodiment does not preclude the application of individual technical ideas disclosed in each embodiment to other types of display devices and illumination devices. Other types of display devices may include, for example, liquid crystal displays with, in addition to the transmissive function, a function of a reflective type which reflects outside light and utilizes the reflected light for display, and display devices including a mechanical display panel in which micro-electromechanical system (MEMS) shutters function as optical elements. Other types of illumination devices may include, for example, front lights that are placed on a front side of the display device. Further, the illumination device may be used for a different purpose than the illumination of the display device.

EMBODIMENT

FIG. 1 is a schematic diagram showing a brief configuration of a display device according to an embodiment. The display device DSP can be used in various devices, such as smartphones, tablet terminals, cell phone terminals, personal computers, TV receivers, in-vehicle devices, game devices, wearable terminals and the like.

The display device DSP comprises a display panel PNL, an illumination device ILD, which is a backlight, a drive IC chip ICP which drives the display panel PNL, and flexible printed circuit boards FPC1 and FPC2 which transmit control signals to the display panel PNL and the illumination device ILD. For example, the flexible printed circuit boards FPC1 and FPC2 are each connected to a control module which controls the operation of the display panel PNL and the illumination device ILD. In the display device DSP, the display panel PNL modulates the illumination light emitted from the illumination device ILD and emits it as video light, thereby performing display operation.

The display panel PNL comprises a first substrate SUB1 (array substrate) and a second substrate SUB2 (counter substrate) opposing the first substrate SUB1. The display panel PNL includes a display area DA for displaying images. The display panel PNL comprises a plurality of pixels PX arranged in a matrix in the display area DA, for example.

The illumination device ILD comprises a first light source element LS1, a second light source element LS2, and a light guide LG opposing the first substrate SUB1. The first light source element LS1 opposes a first side surface F3 of the light guide LG, which is one side surface thereof. The second light source element LS2 opposes a second side surface F4, which is the other side surface of the light guide LG. FIG. 1 shows only one of each of the first light source elements LS1 and the second light source elements LS2, but in reality, a plurality of first light source elements LS1 and a plurality of second light source elements LS2 are provided along the second direction Y.

As will be described in detail later, the light source elements may not be provided to oppose both the first side surface F3 and the second side surface F4, but it suffices if the light source elements are provided to oppose at least one of the side surfaces. In such a case, a reflector should be provided on the side surface on which the light source elements are not provided.

In the example of FIG. 1, the first substrate SUB1, the second substrate SUB2 and the light guide LG each include long sides along the first direction X and short sides along the second direction Y, and the shapes thereof are rectangular in plan view. But, the shapes of the first substrate SUB1, the second substrate SUB2 and the light guide LG are not limited to those of this example, but they may be other shapes such as square, circular and the like in plan view.

Figure 2:
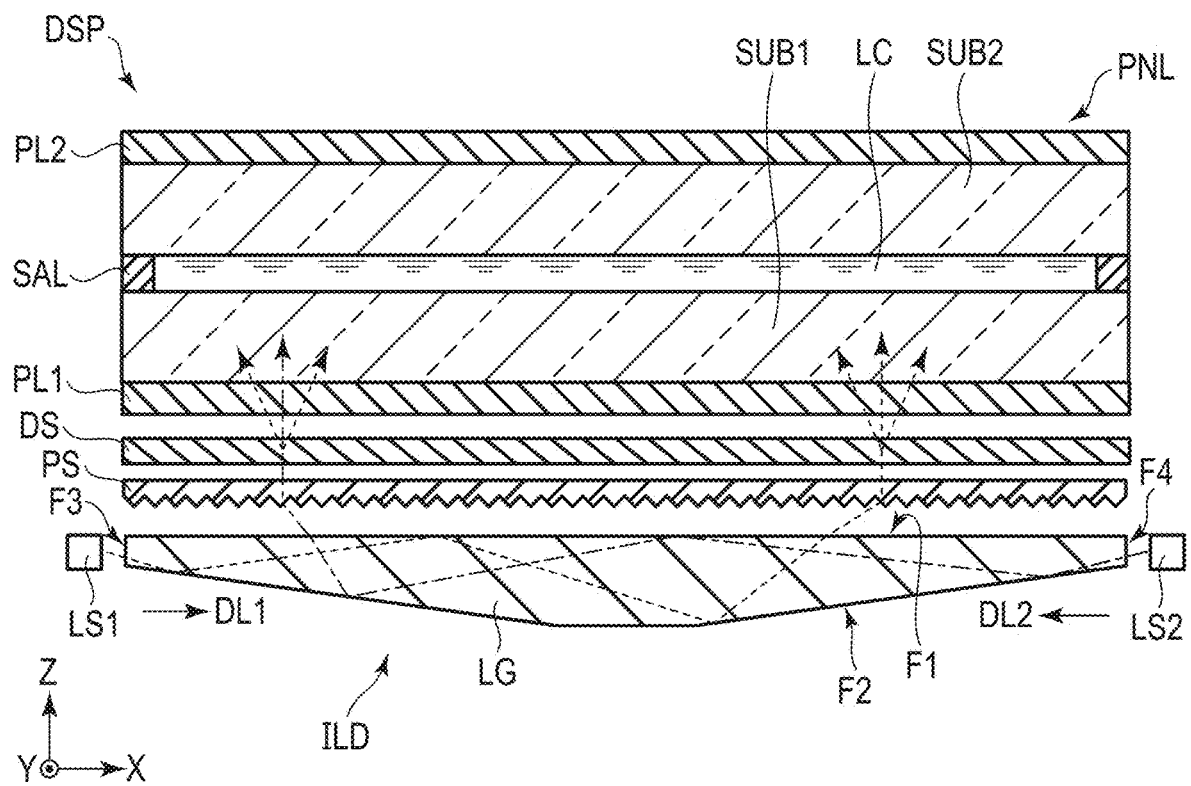
FIG. 2 is a cross-sectional view schematically showing a configuration example of the display device.

FIG. 2 is a cross-sectional view schematically showing an example of a configuration of a display device. The display panel PNL further comprises a sealant SAL and a liquid crystal layer LC. The first substrate SUB1 and the second substrate SUB 2 are bonded together by the sealant SAL. The liquid crystal layer LC is sealed in the space formed between the first substrate SUB1, the second substrate SUB2 and the sealant SAL.

On a lower surface of the first substrate SUB1 (the surface opposing the light guide LG), a first polarizer PL1 is attached. On an upper surface of the second substrate SUB2 (the surface not opposing the first substrate SUB1), a second polarizer PL2 is attached. Polarization axes of the first polarizer PL1 and the second polarizer PL2 are orthogonal to each other.

The light guide LG includes a first main surface F1 opposing the display panel PNL, a second main surface F2 on an opposite side to the first main surface F1, a first side surface F3, and a second side surface F4 on an opposite side to the first side surface F3. The first light source elements LS1 oppose the first side surface F3, and the second light source elements LS2 oppose the second side surface F4. Between the first light source elements LS1 and the first side surface F3 and between the second light source elements LS2 and the second side surface F4, optical elements such as lenses may be placed to adjust the width and angle of the light from each of the first light source elements LS1 and the second light source elements LS2.

The first light source elements LS1 irradiate diffused light spreading from a first irradiation direction DL1 as a center onto the first side surface F3. The second light source elements LS2 irradiates diffused light spreading from a second irradiation direction DL2 as a center to the second side surface F4. The first irradiation direction DL1 and the second irradiation direction DL2 are, for example, opposite to each other and parallel to the first direction X. The light emitting elements of the first light source elements LS1 and second light source elements LS1 and LS2 may be, for example, laser light sources such as semiconductor lasers which emit a polarized laser beam. The light emitting elements of the first light source elements LS1 and the second light source elements LS2 are not limited to those which emit laser light, but, for example, light-emitting diodes can be used as well.

The first light source elements LS1 and the second light source elements LS2 may comprise a plurality of light-emitting elements which emit light of different colors. For example, when the first light source elements LS1 and the second light source elements LS2 each comprise three light-emitting diodes emitting red, green, and blue light, respectively, light of a mixture of these colors (for example, white) can be obtained.

The display device DSP comprises a prism sheet PS between the display panel PNL and the light guide LG. Further, the display device DSP comprises a diffusion sheet DS (diffusion layer) between the prism sheet PS and the display panel PNL. For example, the prism sheet PS comprises a number of prisms extending parallel to the second direction Y. The prisms are formed, for example, on the lower surface of the prism sheet PS (the surface opposing the light guide LG). Note here that the prisms may as well be formed on the upper surface of the prism sheet PS (the surface opposing the display panel PNL).

In FIG. 2, an example of an optical path of light emitted by the first light source element LS1 is indicated by a dashed line, and that of light emitted by the second light source element is indicated by a single dotted line. The light emitted by the first light source element LS1 enters the light guide LG from the first side surface F3 and propagates through the light guide LG while reflecting on the first main surfaces F1 and the second main surface F2. Light that deviates from the total reflection condition of the first main surface F1 is emitted from the first main surface F1.

The light emitted by the second light source element LS2 enters the light guide LG from the second side surface F4 and propagates through the light guide LG while being reflected on the first main surfaces F1 and the second main surface F2. Light which deviates from the total reflection condition of the first main surface F1 is emitted from the first main surface F1.

Thus, the first main surface F1 is equivalent to the emitting surface from which light is emitted.

The prism sheet PS converts the light emitted from the first main surface F1 into light substantially parallel to the third direction Z. Here, the expression "light substantially parallel to the third direction Z" includes not only light strictly parallel to the third direction Z, but also light with an inclination with respect to the third direction Z, which is converted by the prism sheet PS to be sufficiently smaller than when emitted from the first main surface F1. From the viewpoint of maintaining the polarization of light from each of the first light source elements LS1 and the second light source elements LS2, it is preferable that the prisms of the prism sheet PS be formed on the lower surface.

Light having passed through the prism sheet PS is diffused by the diffusion sheet DS and irradiated to the display panel PNL. Even if the viewing angle of the light having passed through the prism sheet PS is narrow, the viewing angle can be widened by diffusing this light with the diffusion sheet DS.

Note that when the light from the first light source elements LS1 and the second light source elements LS2 reaches the display panel PNL in a sufficiently polarized state, the first polarizer PL1 may be omitted. When the first polarizer PL1 is omitted, for example, the translucency of each of the first substrate SUB1 and the second substrate SUB2 is increased. In this manner, the so-called transparent liquid crystal display device in which the background of the display device DSP can be seen through, can be obtained.

Figure 3:
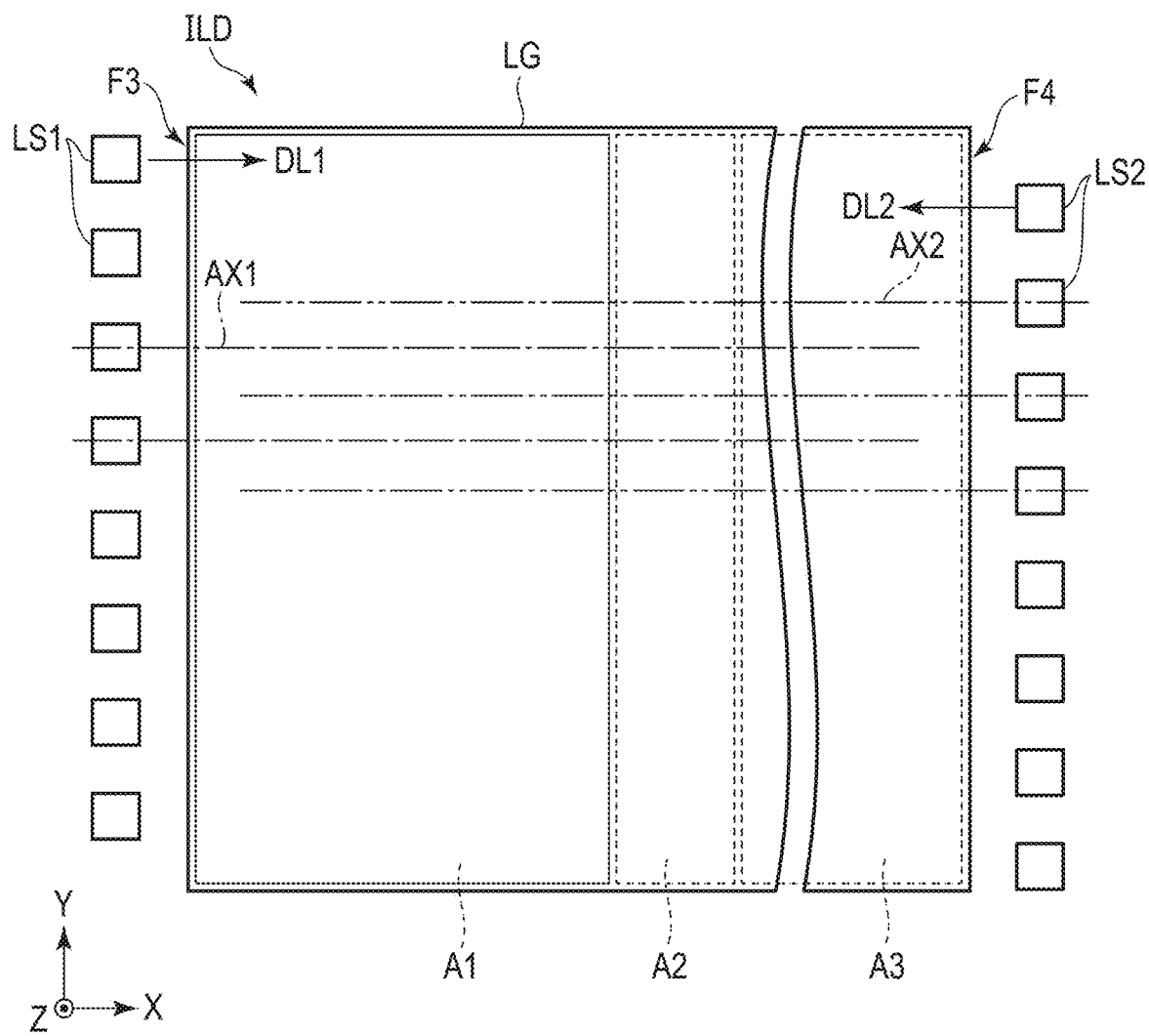
FIG. 3 is a plan view schematically showing a configuration example of an illumination device.

FIG. 3 is a plan view schematically showing an example of a brief configuration of the illumination device. In FIG. 3, eight of the first light source elements LS1 are aligned along the first side surface F3, and eight of the second light source elements LS2 are aligned along the second side surface F4. The intensity of the light emitted by the first light source elements LS1 is at the maximum in a first optical axis AX1, and the intensity of the light emitted by the second light source element LS2 is at the maximum in a second optical axis AX2.

The first light source elements LS1 and the second light source elements LS2 are arranged alternately along the second direction Y, as shown in the figure. That is, the first optical axis AX1 of the light emitted from the first light source elements LS1 in the first irradiation direction DL1 and the second optical axis AX2 of the light emitted from the second light source elements LS2 in the second irradiation direction DL2 are shifted from each other along the second direction Y. Note that the first optical axis AX1 and the second optical axis AX2 may be aligned with each other along the second direction Y.

FIG. 4 is a cross-sectional view schematically showing an example of the configuration of the light guide. The first main surface F1 of the light guide LG is a plane parallel to the first direction X and the second direction Y. The second main surface F2 includes a first area A1, a second area A2 and a third area A3. As shown in the plan view of FIG. 3, the first area A1 is provided from one end of the light guide LG in the second direction Y to the other end, so as to be adjacent to the first side surface F3. The third area A3 is provided from one end of the light guide LG to the other end in the second direction Y, so as to be adjacent to the second side surface F4. The second area A2 is provided from one end of the light guide LG to the other end in the second direction Y, so as to be located between the first area A1 and the third area A3.

The first area A1, the second area A2 and the third area A3 are arranged in this order along the first irradiation direction DL1. For example, along the first direction X, the width of the first area A1 and the width of the third area A3 are equal to each other. Further, along the first direction X, the width of the second area A2 is smaller than each of the width of the first area A1 and the width of the third area A3. Note that the widths of the first area A1 and the third area A3 may be different from each other, or the width of the second area A2 may be greater than or smaller equal to each of the width of the first area A1 and the width of the third area A3.

As shown in FIG. 4, the first area A1 and the third area A3 are inclined with respect to the first main surface F1. The second area A2 is parallel to the first main surface F1. The word "parallel" here covers cases where the second area A2 is inclined with respect to the first main surface F1 at an angle sufficiently less than the angle at which each of the first area A1 and the third area A3 is inclined to the first main surface F1 (which is the case where it is substantially parallel to the first main surface F1).

On the second main surface F2, a plurality of convex portions P are provided. The convex portions P include a plurality of first convex portions P1 in the first area A1, a plurality of second convex portions P2 in the second area A2, and a plurality of third convex portions P3 in the third area A3. The first convex portion P1, the second convex portion P2 and the third convex portion P3 each extend along the second direction Y. The cross-sectional shape of the first convex portion P1 is uniform in the second direction Y, for example, but may be different. This is also the case for the second convex portion P2 and the third convex portion P3.

For example, the first convex portion P1 and the second convex portion P2 are different in shape from each other. The third convex portion P3 and the second convex portion P2 as well are different in shape from each other. The first convex portion P1 and the third convex portion P3 may have the same shape (including symmetrical shapes).

For example, the density (the number per area) of the first convex portions P1 and the density of the second convex portions P2 are different from each other. The density of the plurality of third convex portions P3 and the density of the plurality of second convex portions P2 as well are different from each other. The density of the plurality of first convex portions P1 and the density of the plurality of third convex portions P3 may be the same.

In cross-sectional view, a line segment connecting vertices of the plurality of first convex portions P1 is referred to as a first virtual line VL1, a line segment connecting vertices of the plurality of second convex portions P2 is referred to as a second virtual line VL2, and a line segment connecting vertices of the plurality of third convex portions P3 is referred to as a third virtual line VL3. In FIG. 4, the first virtual line VL1, the second virtual line VL2 and the third virtual line VL3 are all straight lines. But, the first virtual line VL1, the second virtual line VL2 and the VL3 each may be at least partially bent or curved.

The first virtual line VL1 is inclined at a first angle α1 with respect to the first main surface F1. The third virtual line VL3 is inclined at a third angle α3 with respect to the first main surface F1. Both the first angle α1 and the third angle α3 are acute angles. For example, the first angle α1 and the third angle α3 are substantially equal to each other (α1≈α3). Note that the first angle α1 and the third angle α3 may be different from each other (α1≠α3).

The second virtual line VL2 is inclined with respect to the first virtual line VL1 and the third virtual line VL3. The second angle α2 formed between the second virtual line VL2 and the first main surface F1 is less than each of the first angles α1 and the third angle α3 (α2<α1, α3). In FIG. 4, the second virtual line VL2 is parallel to the first main surface F1. Here, the word "parallel" includes the cases where, in addition to when the second angle α2 is 0°, the angle is sufficiently smaller than the first angle α1 and the third angle α3 (substantially parallel to the first main surface F1).

Here, the thickness of the light guide LG in the first area A1 (the distance between the first area A1 and the first main surface F1) is defined as D1, the thickness of the light guide LG in the second area A2 (the distance between the second area A2 and the first main surface F1) is defined as D2, and the thickness of the light guide LG in the third area A3 (the distance between the third area A3 and the first main surface F1) is defined as D3. The distance D1 increases from the first side surface F3 toward the boundary between the first area A1 and the second area A2. The distance D3 increases from the second side surface F4 toward the boundary between the second area A2 and the third area A3. In FIG. 4, the distance D2 is constant.

In such a shape, the distance D2 is longer than the distance D1 at any location in the first area A1 (D2>D1). Further, the distance D2 is longer than the distance D3 at any location in the third area A3 (D2>D3). The distances D1, D2 and D3 may as well be referred to as a first distance, a second distance and a third distance, respectively.

Figure 5:
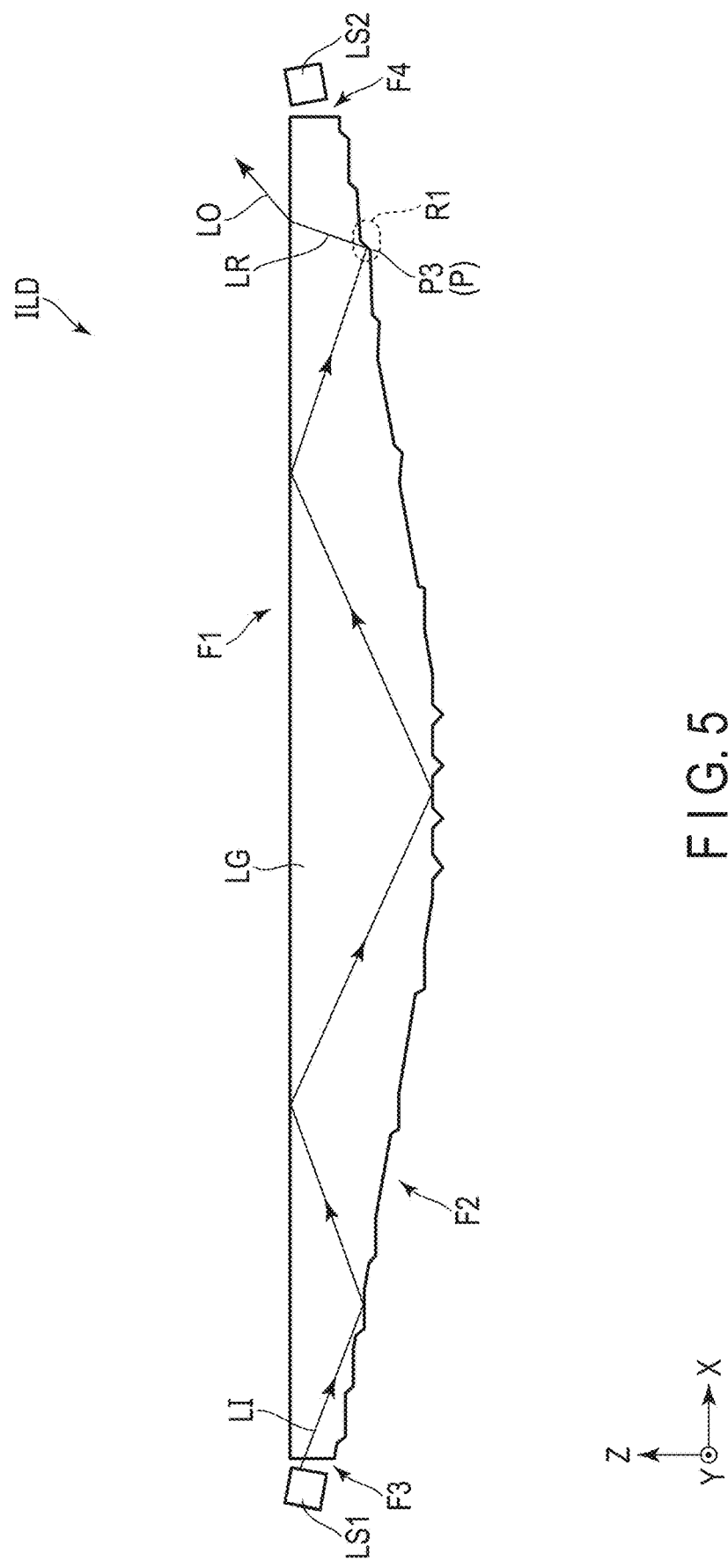
FIG. 5 is a cross-sectional view of an illumination device.

Here, the propagation and emission of light in the light guide LG will now be described in more detail. FIG. 5 is a cross-sectional view of the illumination device. Light emitted from the first light source element LS1 enters the light guide LG from the first side surface F3. While satisfying the total reflection condition, incident light LI propagates while repeating total reflection between the first main surface F1 and the second main surface F2.

When the incident light LI reflects on a convex portion P, for example, the third convex portion P3 in FIG. 5, the reflection angle changes to deviate from the total reflection condition. The reflected light LR which deviates from the total reflection condition is emitted upward into the air from the first main surface F1. The light emitted upward is referred to as LO.

Figure 6A:
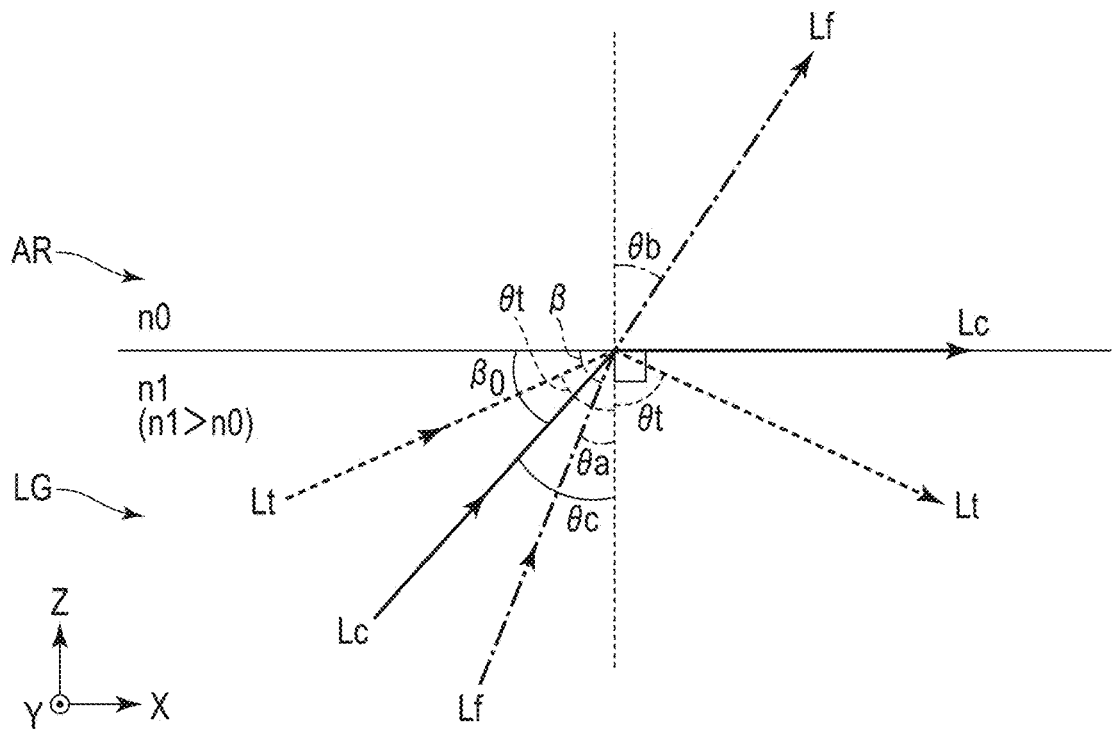
FIG. 6A is a diagram showing light reflected between different media.

Here, the incident angle of the incident light LI and the angle α of the convex portion P will now be explained. FIG. 6A is a diagram showing light reflected between different media. In FIG. 6A, the light emitted from a medium having a refractive index n1 to a medium having a refractive index n0 at the interface between the two media with the refractive indices n0 and n1, respectively, is referred to as Lf. Note here that the refractive index n1 is greater than the refractive index n0 (n1>n0). In this embodiment, more specifically, the light Lf is the light emitted from the light guide LG to the air AR. The refractive index n0 of the air AR is 1 (n0=1), and the refractive index n1 of the light guide LG is greater than 1 (n1>1). If the incident angle of the light Lf is expressed by θa and the refraction angle is expressed by θb, the refraction angle θb is greater than the incident angle θa (θb>θa). If the angle of the difference between 90° and the incident angle θa is expressed by β, then β=(90°−θa).

Total reflection occurs when the refracted light is at an angle along the interface between the light guide LG and the air AR. The refracted light along the interface means that the refraction angle θb is 90°. The incident angle of the case where the refraction angle θb is 90° is referred to as a critical angle θc. In FIG. 6A, light having a critical angle θc is expressed by Lc. The incident angle θa of the light Lc is the critical angle θc (θa=θc). When an angle of difference between 90° and the incident angle θc is expressed by β0, then β0=(90°−θC).

When the incident angle θa is less than the critical angle θc, the total reflection condition is not satisfied. When the incident angle θa is greater than or equal to the critical angle θc, the total reflection condition is satisfied. The relationship between the incident angle θa and the refraction angle θb is constant for the same medium. Therefore, when angle β(=90°−θa) is greater than the angle β0, the total reflection condition is not satisfied. When the angle β is less than the angle β0, the total reflection condition is satisfied and the light propagates in the light guide LG. When the angle β is equal to the angle β0, the light propagates along the interface as described above.

The light reflected by the interface between the light guide LG and the air AR and propagating within the light guide LG is expressed by Lt. The incident angle and the reflection angle (which is referred to as angle θt) are equal to each other.

Figure 6B:
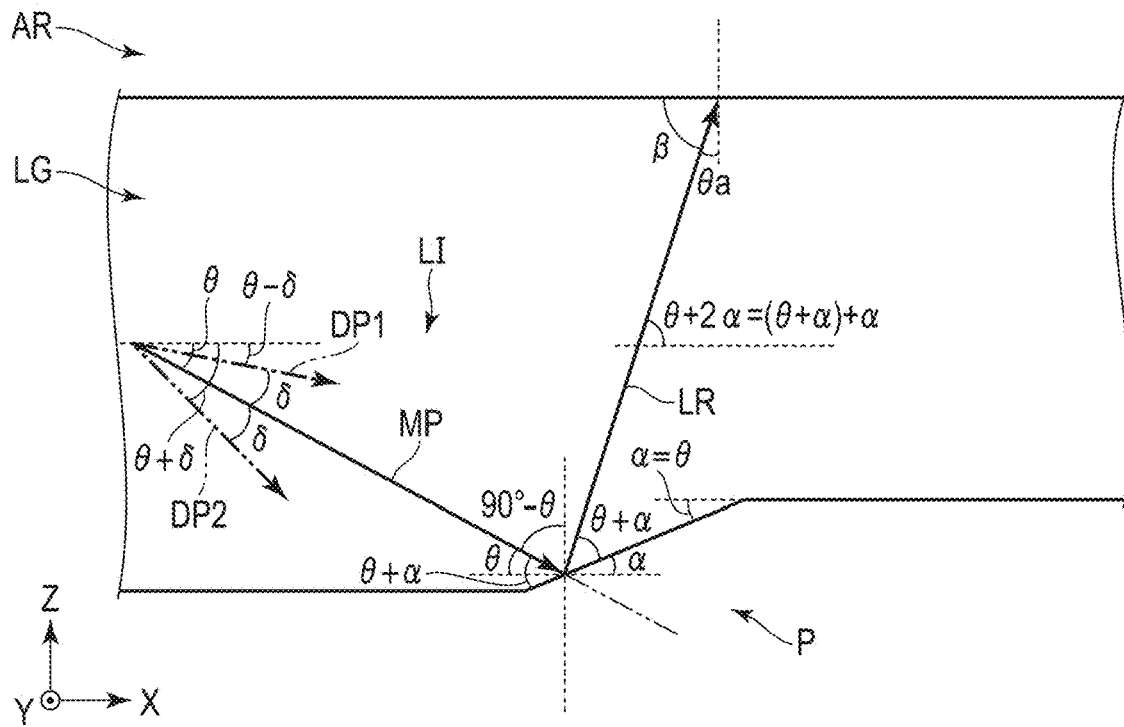
FIG. 6B is a diagram showing that incident light, which is diffused light, is reflected by a convex portion.

As described above, the incident light LI emitted from the first light source element LS1 is diffuse light which spreads. FIG. 6B is a diagram showing that the incident light, which is diffused light, is reflected by the convex portion. In FIG. 6B, the incident angle of the incident light LI is expressed by θ, main ray of the incident light LI is expressed by MP, and the diffusion angle from the main ray MP is expressed by δ. The outermost diffuse components in the range of the diffusion angle δ from the main ray MP are expressed by DP1 and DP2. In FIG. 6B, the diffuse component DP1 is tilted counterclockwise from the main ray MP by the diffusion angle δ. The diffuse component DP2 is tilted clockwise from the main ray MP by the diffusion angle δ. In other words, the diffuse components DP1 and DP2 are inclined with respect to the direction parallel to the first direction X by an angle $(\theta-\delta)$ and an angle $(\theta+\delta)$, respectively. The angle $(\theta-\delta)$ is the minimum angle to the first direction X. The angle $(\theta+\delta)$ is the maximum angle to the first direction X.

Let us consider the condition where the main ray MP is emitted from the light guide LG into the air AR. As shown in FIG. 6B, the angle β is equal to the angle $((\theta+\alpha)+\alpha)((\beta=(\theta+\alpha)+\alpha)=\theta+2\alpha)$. As described above, when the angle β is greater than the angle β0, the Light is emitted into the air AR. Therefore, a relationship of $(\theta+2\alpha)>\beta0$ (Formula 2) is established.

Let us consider the condition in which the main ray MP is totally reflected by the convex portion P. As described above, when the angle β is less than the angle β0, the total reflection condition is satisfied and the light propagates in the light guide LG. Therefore, in this case, a relationship of $(\theta+\alpha)>\beta0$ (Formula 3) is established.

Figure 7A:
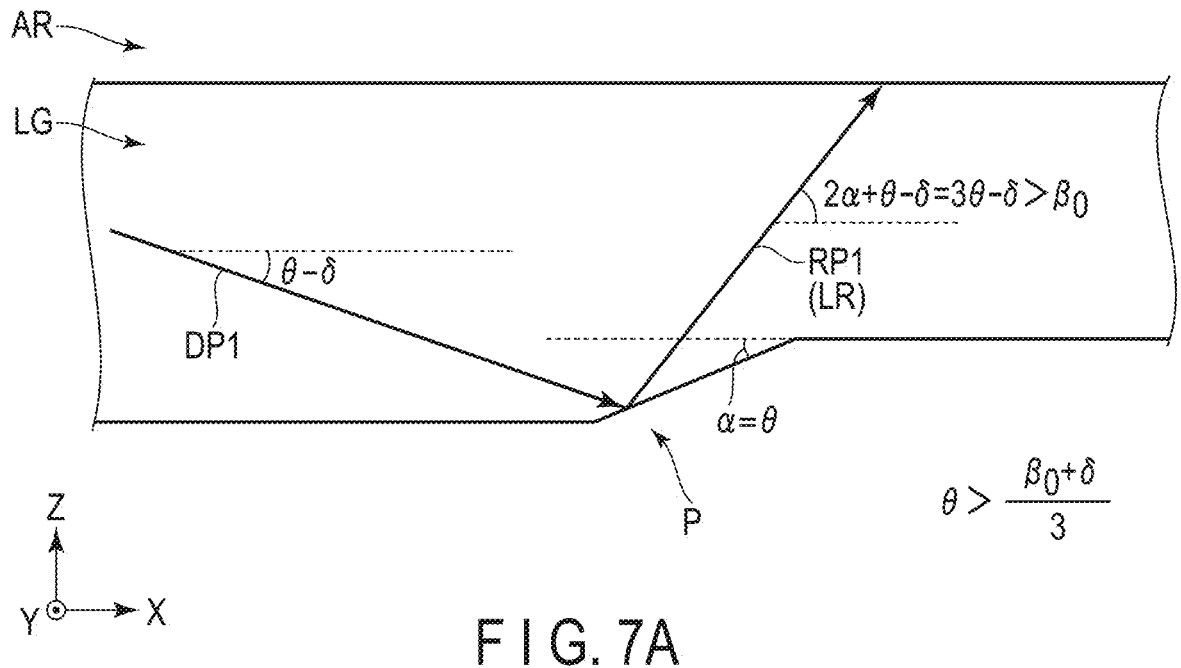
FIG. 7A is a diagram showing a condition for a diffused component that forms a minimum angle.
Figure 7B:
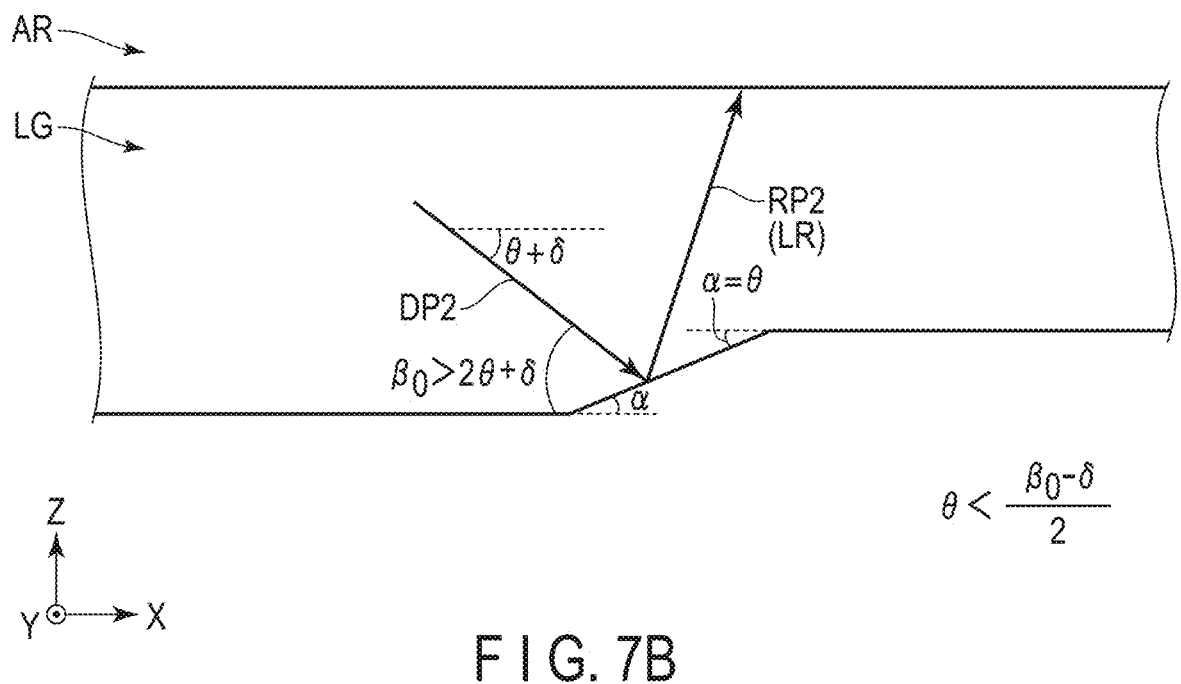
FIG. 7B is a diagram showing a condition for a diffused component that forms a maximum angle.

The diffused components which make the minimum and maximum of the incident angle θ of the light emitted from the light guide LG into the air will be explained. FIG. 7A is a diagram showing a condition for a diffuse component which makes the minimum angle. FIG. 7B is a diagram showing a condition for a diffuse component which makes the maximum angle.

In the case where the diffuse component DP1, which is inclined from the first direction X at an angle $(\theta-\delta)$, is reflected by the convex portion P having the angle α, the condition for emitting a diffuse component of the minimum angle is satisfied (see FIG. 7A). If the reflected diffuse component, RP1 (reflected light LR), deviates from the total reflection condition, the angle which the diffuse component RP1 makes with the first direction X is $(2\alpha+\theta-\delta)$.

The details thereof will be described later, but the incident angle θ is equal to the angle α of the convex portion P. Therefore, a relationship of $(2\alpha+\theta-\delta)=(3\theta-\delta)$ (Formula 4) is satisfied. Because $(3\theta-\delta)>\beta0$, a relationship of $\theta>((\beta0+\delta)/3)$ (Formula 5) can be derived from Formula 4.

When the diffuse component DP2, which is inclined from the first direction X at an angle $(\theta+\delta)$, is totally reflected by the convex portion P having an angle α, the condition for the diffuse component which makes the maximum angle to be totally reflected by the convex portion P is satisfied (see FIG. 7B). When the reflected diffuse component, RP2 (reflected light LR), is reflected under the total reflection condition, the angle made by the diffuse component RP2 with respect to the first direction X is $((\theta+\delta)+\alpha)$.

As described above, the incident angle θ is equal to the angle α of the convex portion P. Therefore, a relationship of $((\theta+\delta)+\alpha)=(2\theta+\delta)$ (Formula 6) is satisfied. Because of a relationship of $\beta0>(2\theta+\delta)$, a relationship of $\theta<((\beta0-\delta)/2)$ (Formula 7) can be derived from Formula 6.

From Formula 5 and Formula 7, a relationship of $((\beta0+\delta)/3)<\theta<((\beta0-\delta)/2)$ (Formula 8) is established. Light whose incident angle θ satisfies Formula 8 is illumination light having high emission efficiency.

Figure 8A:
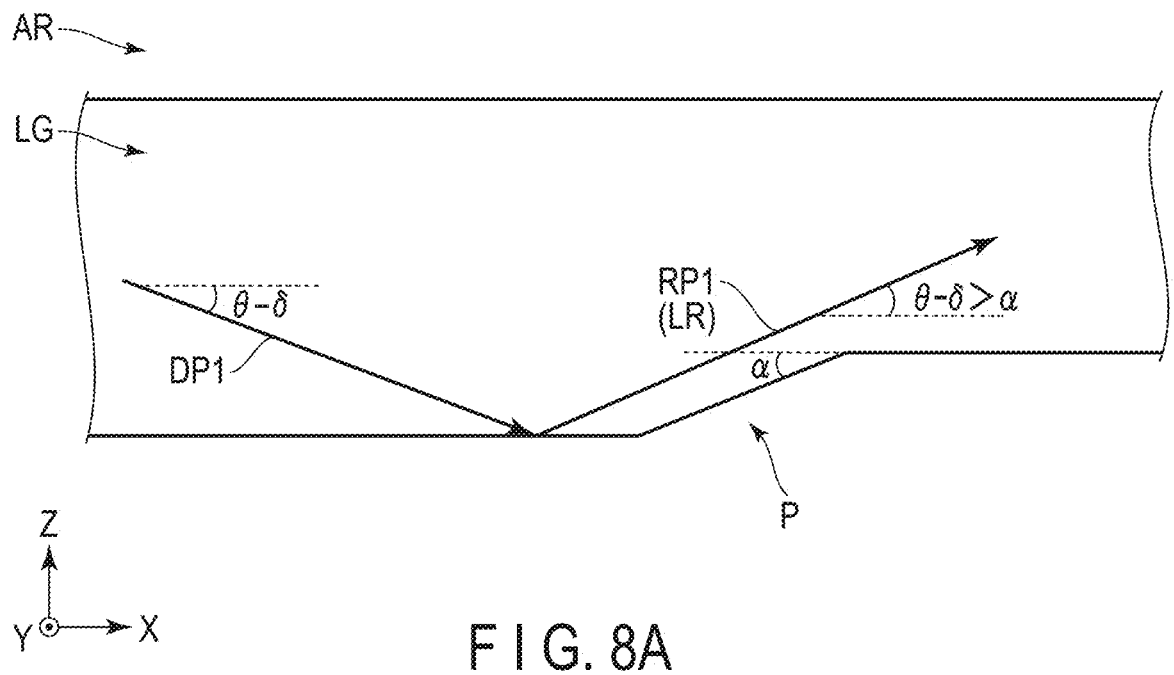
FIG. 8A is a diagram showing a condition for a diffused component which forms the minimum angle to conduct light.
Figure 8B:
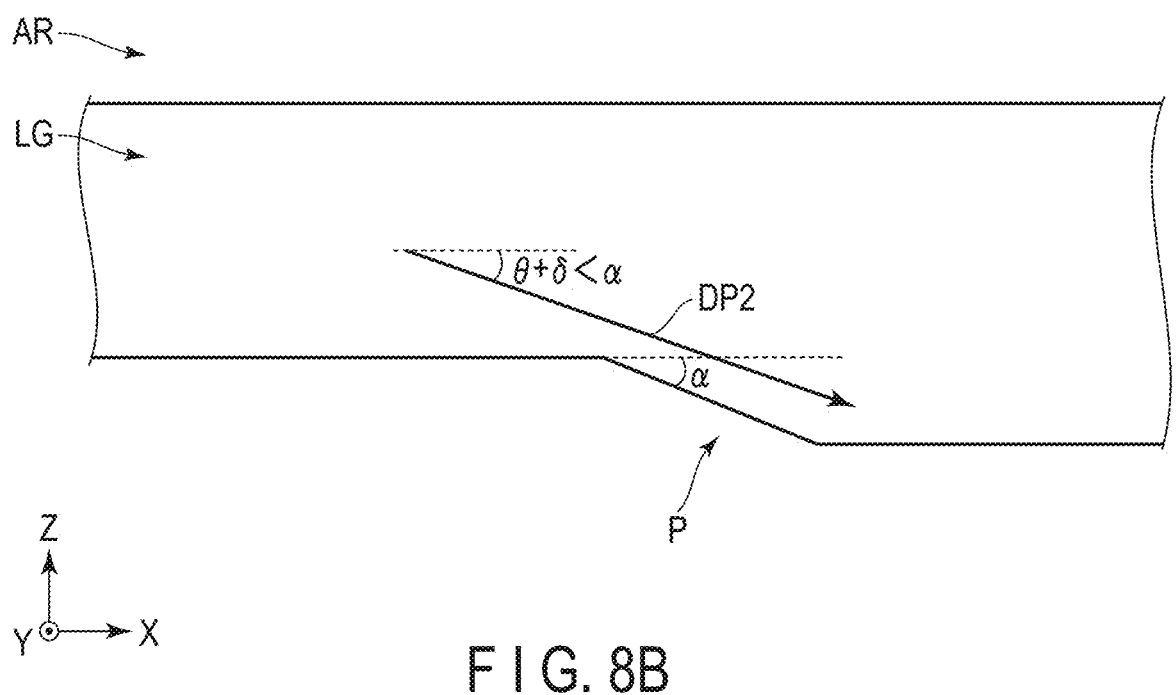
FIG. 8B is a diagram showing a condition for a diffused component which forms the maximum angle to conduct light.

Here, the incident angle θ being equal to the angle α of the convex portion P will be described. FIG. 8A is a diagram showing a condition under which the diffuse component which makes the minimum angle conducts light. FIG. 8B is a diagram showing the condition that the diffuse component that makes the maximum angle conducts light.

Let us consider a condition where the diffuse component that makes the minimum angle propagates inside the light guide LG without being reflected by the convex portion P. As shown in FIG. 8A, when the diffuse component DP1 inclined from the first direction X at an angle $(\theta-\delta)$ satisfies a relationship of $(\theta-\delta)>\alpha$ (Formula 9), the diffuse component DP1 is not reflected by the convex portion P.

Let us consider a condition where the diffuse component that makes the minimum angle propagates inside the light guide LG without hitting the convex portion P. As shown in FIG. 8B, when the diffuse component DP2 inclined from the first direction X at an angle $(\theta+\delta)$ satisfies a relationship of $(\theta-\delta)<\alpha$ (Formula 10), the diffuse component DP2 does not hit the convex portion P.

Figure 9A:
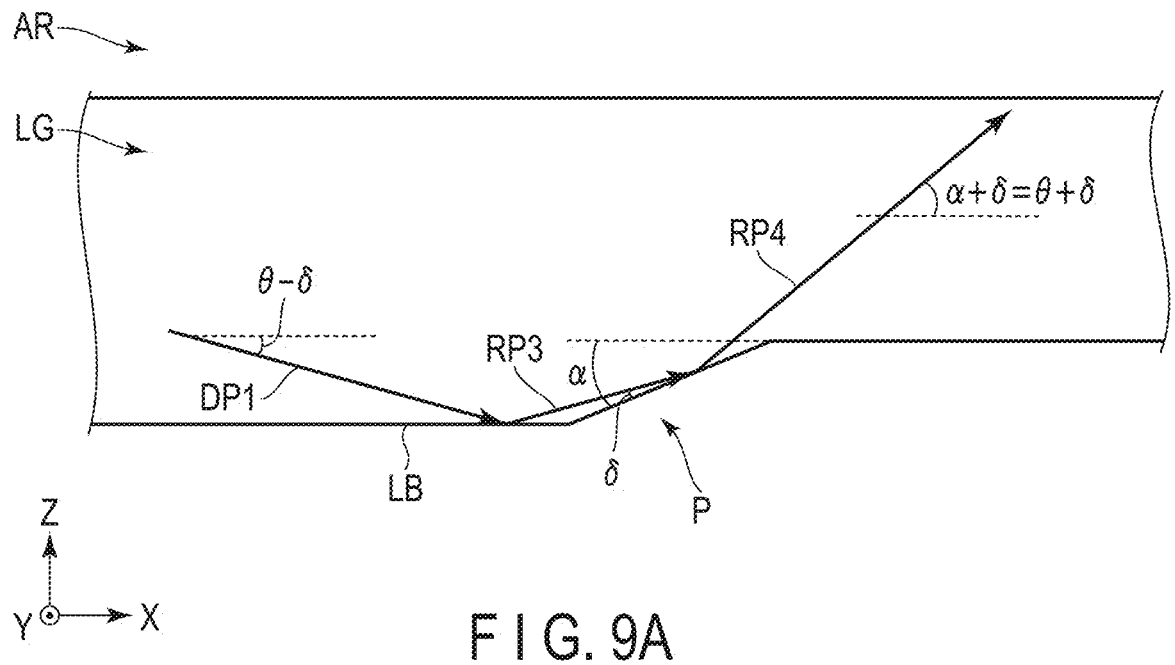
FIG. 9A is a diagram showing that a diffused component which forms the minimum angle is reflected by a bottom portion and a convex portion of the light guide.

In order to satisfy Formulas 9 and 10 at the same time, it is necessary that the angle θ be equal to the angle α $(\theta=\alpha)$. FIG. 9A is a diagram showing that the diffuse component that makes the minimum angle is reflected by the bottom portion and the convex portion of the light guide, and FIG. 9B is a diagram showing that the diffuse component that makes the maximum angle is reflected by the convex portion.

FIG. 9A shows the case where the diffuse component DP1, which makes the minimum angle, is reflected by the bottom surface of the light guide LG LB, and the reflected diffuse component RP3 is further reflected by the convex portion P. The diffuse component RP4 reflected by the convex portion P is inclined at an angle $(\alpha+\delta)$ from the first direction X. The diffuse component RP4 is directed upward as the diffuse component that makes the maximum angle. That is, the angle $(\alpha+\delta)$ is equal to the angle $(\theta+\delta)((\alpha+\delta)=(\theta+\delta)$ (Formula 11)). In order to satisfy Formula 11, the angle α and the angle θ must be equal to each other $(\alpha=\theta)$.

Figure 9B:
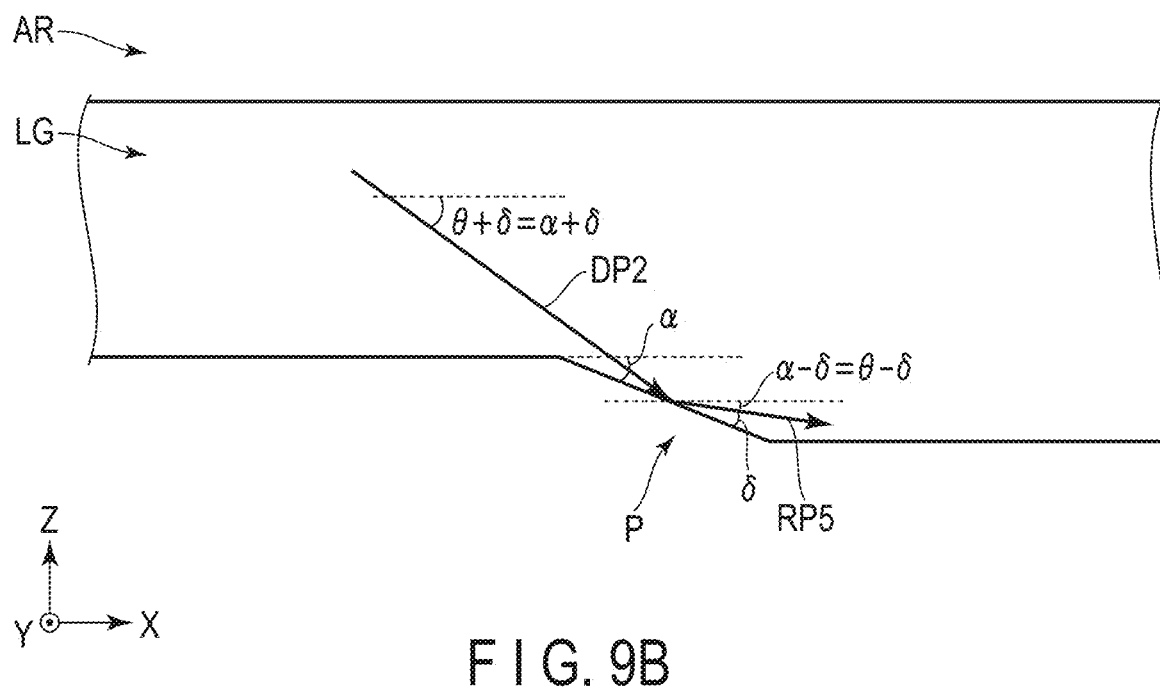
FIG. 9B is a diagram showing that a diffused component which forms the maximum angle is reflected by the convex portion.

FIG. 9B shows the case where the diffuse component DP2, which makes the maximum angle, is reflected by the convex portion P. The diffuse component RP5 reflected by the convex portion P is inclined at an angle $(\alpha-\delta)$ from the first direction X. The diffuse component RP5 is directed upward as the diffuse component which makes the minimum angle. That is, the angle $(\alpha-\delta)$ is equal to the angle $(\theta-\delta)$ $((\alpha-\delta)=(\theta-\delta)$ (Formula 12)). In order to satisfy Formula 12, the angle α and the angle θ must be equal to each other $(\alpha=\theta)$.

As described above, for the necessity to satisfy Formulas 11 and 12, the angles α and θ are equal to each other. When applying this to FIGS. 7A and 7B, Formula 8 can be obtained.

Figure 10:
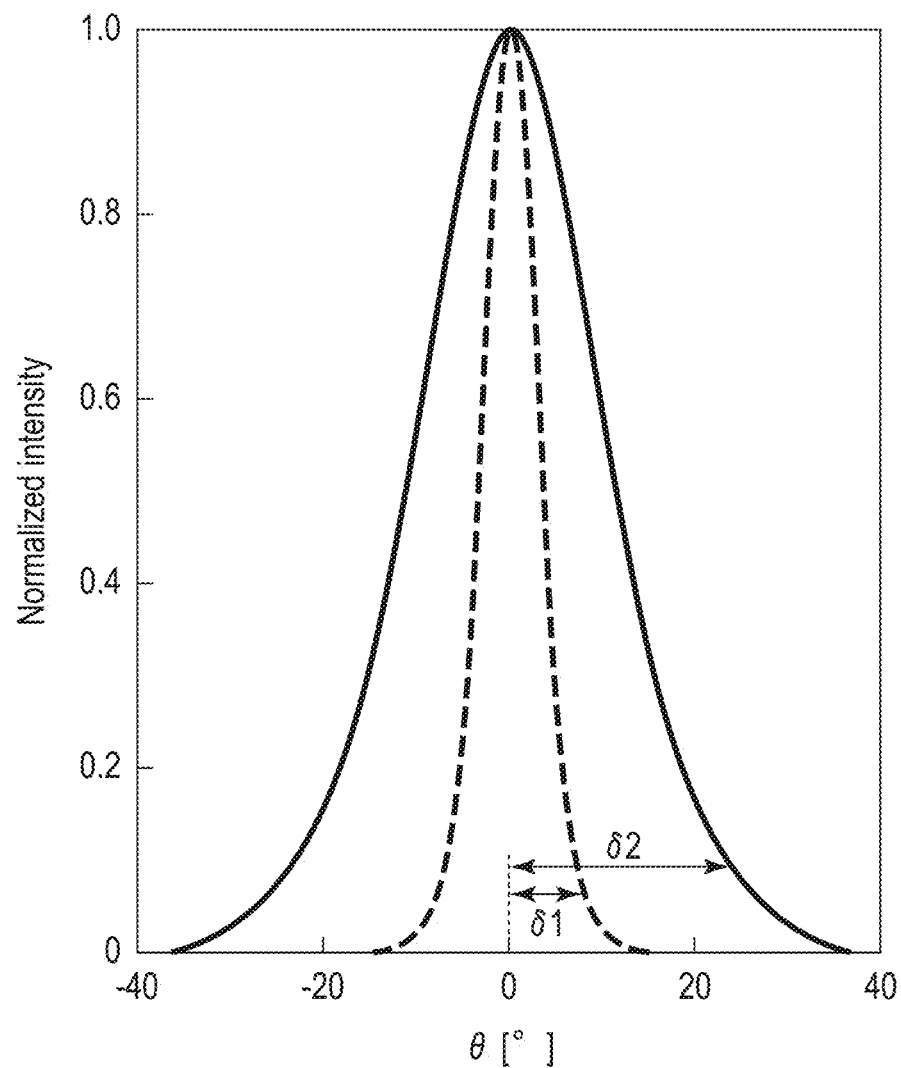
FIG. 10 is a diagram illustrating a diffusion angle of light emitted from a light source element.
Figure 11:
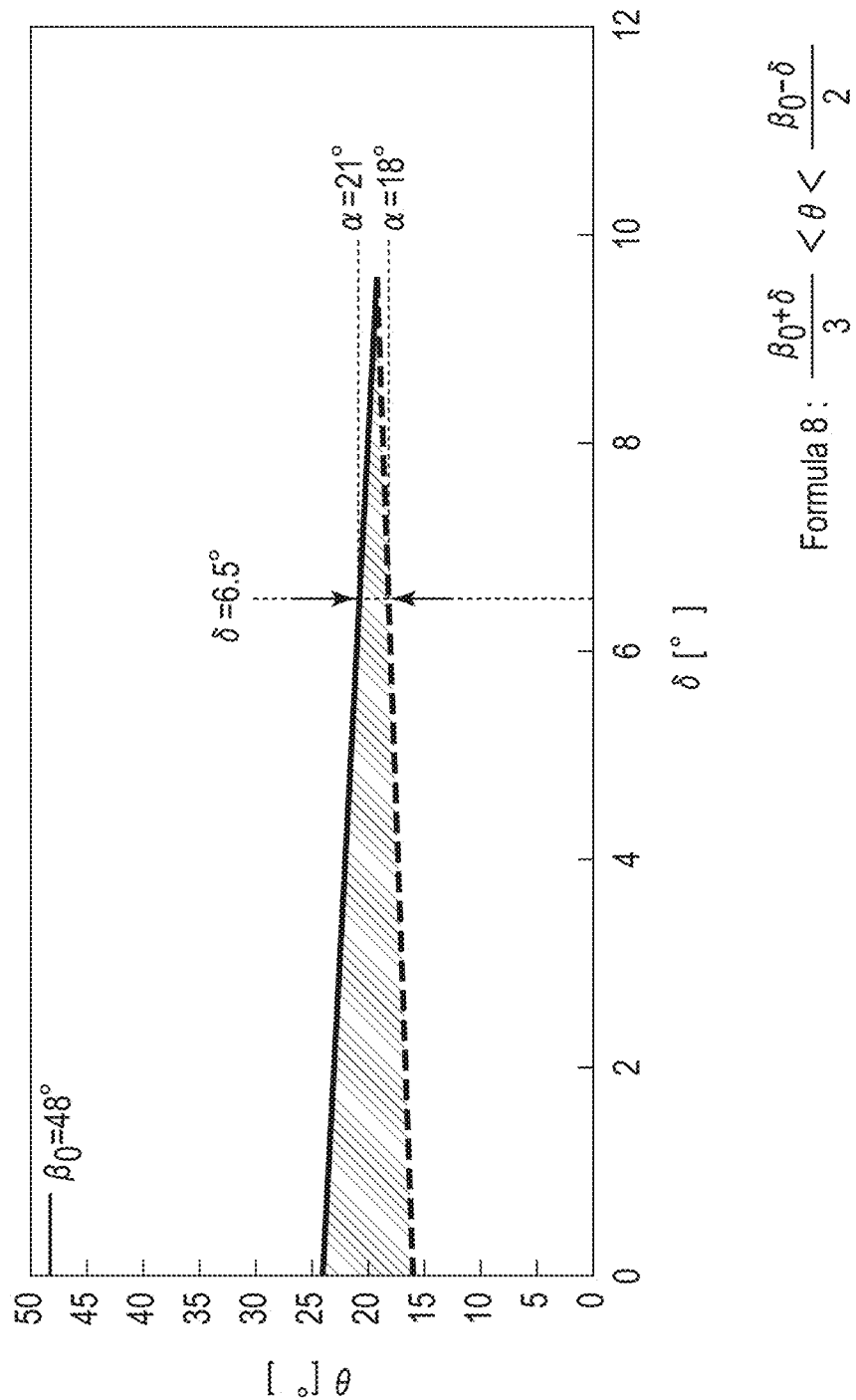
FIG. 11 is a diagram showing a relationship between a diffusion angle and incident light (angle of convex portion) calculated based on FORMULA 8.

FIG. 10 is a diagram illustrating the diffusion angle of the light emitted from the light source elements. For example, as the light source elements LS1 and LS2, laser diodes are used. The horizontal axis in FIG. 10 indicates the incident angle θ, and the vertical axis is the normalized intensity of light emitted from the light source elements. FIG. 10 shows an example having a diffuse component in the range of diffusion angles δ1 and δ2. FIG. 11 is a diagram showing a relationship between the diffusion angle and the incident angle (angle of the convex portion) calculated based on Formula 8. In FIG. 11, the horizontal axis indicates the diffusion angle δ and the vertical axis indicates the incident angle θ. Here, the incident angle θ and the angle α of the convex portion P are equal to each other, and therefore the vertical axis can as well be said to be the angle α. More specifically, FIG. 11 shows the case where β0 (=90°−critical angle θc) is 48°.

From FIG. 11, the angle α (=the incident angle θ) should preferably be 15° or more but 25° or less (15°≤α, θ≤25°).

The diffusion angle δ of light propagating in the light guide LG, for example, should preferably be 6.5° (δ=6.5°). This is because the distribution of the normalized intensity of the light is narrow, as shown in FIG. 10. When calculating the angle α (=incident angle θ) for the case where the diffusion angle δ is 6.5°, it is greater than 18° but less than 21° (18°≤α, θ<21°). The incident angle θ and the angle α of the convex portion P should even more preferably be in the range.

In this embodiment, the relationship between the incident angle θ, diffusion angle δ, and angle β0 (=90°−critical angle θc) is expressed by ((β0+δ)/3)<θ<((β0−δ)/2) (Formula 8). The illumination device ILD which satisfies this range can irradiate light at high output efficiency. In addition, a display device comprising an illumination device ILD having such a high emission efficiency can realize high-luminance image light.

Configuration Example 1

Figure 12:
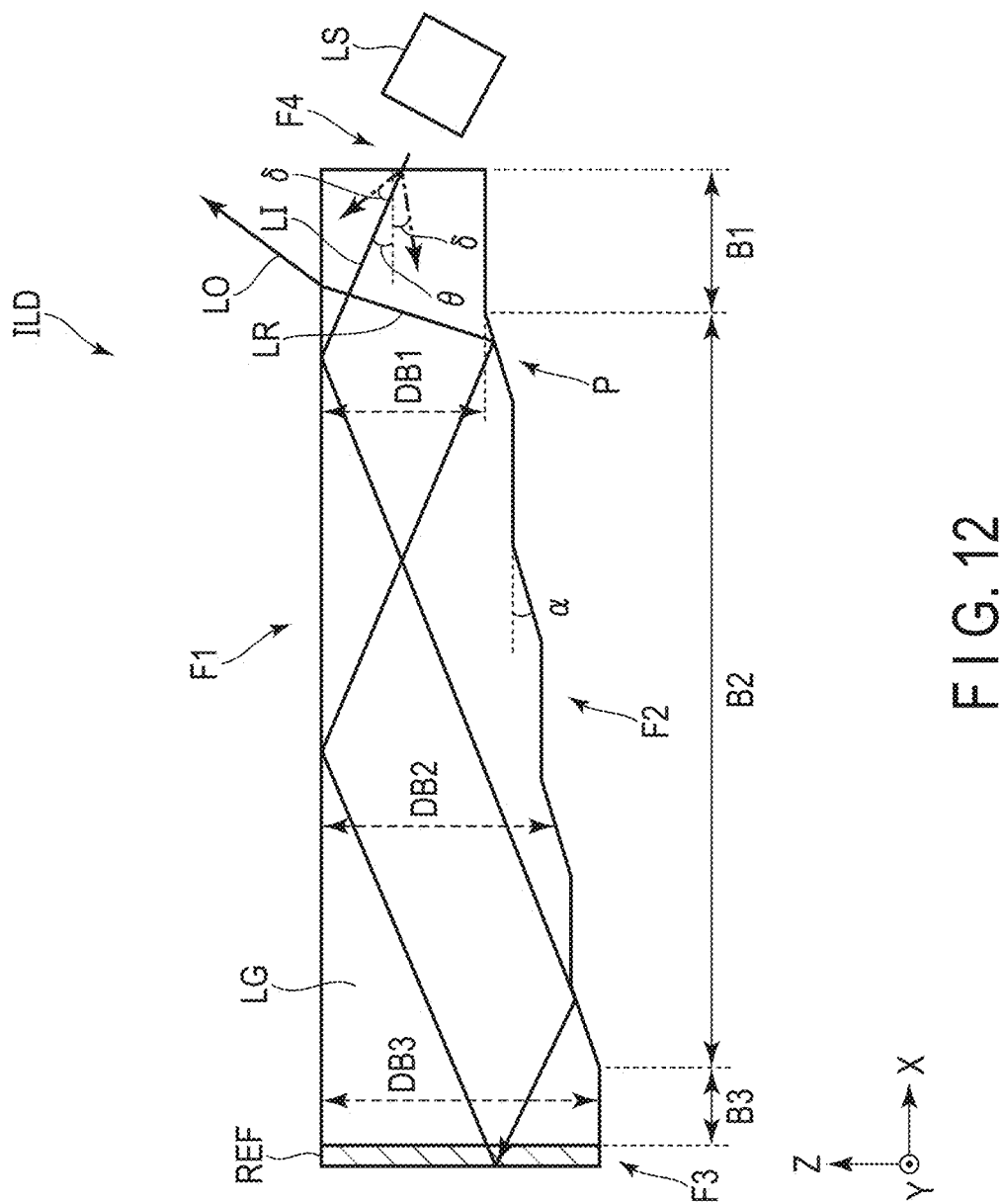
FIG. 12 is a cross-sectional view showing a configuration example of the illumination device in the embodiment.

FIG. 12 is a cross-sectional view of another configuration example of the illumination device in the embodiment. The configuration example shown in FIG. 12 is different from that of FIG. 5 in that the light source elements are provided on only one side surface of the light guide.

In the illumination device ILD shown in FIG. 12, a reflector REF is provided to be in contact with the first side surface F3 of the light guide LG. No light source element is provided on the first side surface F3. Light source elements LS are provided adjacent to the second side surface F4 on an opposite side to the first side surface F3.

The thickness of the light guide LG becomes thicker stepwise as the location approaches the first side surface F3 from the second side surface F4. The second main surface F2 includes a first area B1, a second area B2 and a third area B3 arranged in this order from the second side surface F4 to the first side surface F3.

Here, the thickness of the light guide LG in the first area B1 (the distance between the first area B1 and the first main surface F1) is defined as DB1, the thickness of the light guide LG in the second area B2 (the distance between the second area B2 and the first main surface F1) is defined as DB2, and the thickness of the light guide LG in the third area B3 (the distance between the third area B3 and the first main surface F1) is defined as DB3. The distance DB1 is constant. The distance DB3 is constant. On the other hand, the distance D2 increases from the boundary between the second area B2 and the first area B1 towards the boundary between the second area B2 and the third area B3. The distances DB1, DB2 and DB3 may as well be referred to as the first distance, the second distance and the third distance, respectively.

The second area B2 includes a plurality of convex portions P provided thereon as in the configuration shown in FIG. 5. No convex portion P is provided in the first area B1 or the third area B3. The details of the cross-sectional structure of the convex portion P, incident angle θ, angle α, diffusion angle δ and the like are similar to those of the embodiment, and therefore the descriptions provided in the embodiment should be referred to, which will not be repeated here.

With the third area B3 thus provided, the luminance distribution of the light emitted from the first main surface F1 can be made uniform. Let us consider here the case where the third area B3 is not provided, in other words, no flat area is provided. That is, light entering the light guide LG from the light source elements LS propagates inside the light guide LG and is reflected by the reflector REF. In the case where the third area B3 is not provided, the light reflected by the reflector REF is reflected by the convex portion P provided below the light guide LG. Thus, the light no longer satisfies the condition of total reflection of the first main surface F1, and is emitted from the first main surface F1 of the light guide LG as emitted light LO. In this case, if the third area B3 is not provided, the light reflected by the convex portion near the reflector REF proceeds along the first direction X and then is emitted from the first main surface F1. In other words, light is not emitted from the vicinity of the reflector REF on the first main surface F1, which may cause uneven luminance of the emission light in the first main surface F1.

On the other hand, in the case where the third area B3 is provided, the light reflected by the convex portion of the third area B3, located near the second area B2 is reflected by an upper portion of the reflector REF and then emitted from the first main surface F1 in the vicinity of the reflector REF. In the manner, it is possible to suppresses unevenness in luminance of the emission light and improve the uniformity of luminance distribution.

As shown in this configuration example, even when the light source elements are provided on only respective sides of the first side surface F3 and the second side surface F4, the illumination device ILD, which satisfies the above-provided Formula 8, can irradiate light with high output efficiency. Further, a display device comprising such an illumination device ILD having high emission efficiency can realize high-luminance video light.

In this configuration example, advantageous effects similar to those of the embodiment can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination device comprising:
    a light guide including a first main surface which emits light, a second main surface on an opposite side to the first main surface, a first side surface and a second side surface on an opposite side to the first side surface;
    a plurality of convex portions provided on the second main surface of the light guide; and
    a first light source element and a second light source element which respectively oppose the first side surface and the second side surface of the light guide, wherein
    light emitted from each of the first light source element and the second light source element enters inside the light guide from the first side surface and the second side surface, and the entering light propagates inside the light guide while being reflected on the first main surface and the second main surface, when an incident angle of a main ray of the propagating light is expressed by θ, a diffusion angle of the light is expressed by δ, an angle of the convex portion of the light guide is expressed by α, a critical angle of the light guide is expressed by θc, and an angle which satisfies (90°−θc) is expressed by β0, a relationship: ((β0+δ)/3)<θ<((β0−δ)/2) is satisfied, the second main surface includes a first area adjacent to the first side surface, a third area adjacent to the second side surface, and a second area located between the first area and the third area, a first distance between the first area and the first main surface increases from the first side surface towards a boundary between the first area and the second area, a third distance between the third area and the first main surface increases from the second side toward a boundary between the third area and the second area, and a second distance between the second area and the first main surface is constant and greater than each of the first distance and the third distance.

2. The illumination device according to claim 1, wherein the incident angle θ is 15° or greater but 250 or less.

3. The illumination device according to claim 2, wherein the diffusion angle δ is 6.5° and the incident angle δ is greater than 18° but less than 21°.

4. A display device comprising:
the illumination device according to claim 1; and
a display panel illuminated by illumination light from the illumination device.

5. An illumination device comprising:
a light guide including a first main surface which emits light, a second main surface on an opposite side to the first main surface, a first side surface and a second side surface on an opposite side to the first side surface;
a plurality of convex portions provided on the second main surface of the light guide;

a reflector provided to oppose the first side surface of the light guide; and
a light source element opposing the second side surface of the light guide, wherein
light emitted from the light source element enters inside the light guide from the second side surface, and the entering light propagates inside the light guide while being reflected on the first main surface and the second main surface, when an incident angle of a main ray of the propagating light is expressed by θ, a diffusion angle of the light is expressed by δ, an angle of the convex portion of the light guide is expressed by α, a critical angle of the light guide is expressed by θc, and an angle which satisfies (90°−θc) is expressed by β0, a relationship: ((β0+δ)/3)<θ<((β0−δ)/2) being satisfied, the second main surface includes a first area adjacent to the first side surface, a third area adjacent to the second side surface and a second area located between the first area and the third area, a first distance between the first area and the first main surface is constant, a third distance between the third area and the first main surface is constant, and a second distance between the second area and the first main surface increases from a boundary between the second area and the first area toward a boundary between the second area and the third area.

6. The illumination device according to claim 5, wherein the incident angle θ is 15° or greater but 25° or less.

7. The illumination device according to claim 6, wherein the diffusion angle δ is 6.5° and the incident angle θ is greater than 180 but less than 21°.

8. A display device comprising:
the illumination device according to claim 5, and
a display panel illuminated by illumination light from the illumination device.

* * * * *